United States Patent Office 3,438,221
Patented Apr. 15, 1969

3,438,221
RESILIENT COUPLINGS
Jean-Felix Paulsen, Chateaudun, France, assignor to Societe Luxembourgeoise de Brevets et de Participations
Continuation-in-part of application Ser. No. 579,343, Sept. 14, 1966. This application Mar. 2, 1967, Ser. No. 619,973
Claims priority, application France, July 8, 1966, 68,803
Int. Cl. F16d 3/64, 3/04
U.S. Cl. 64—14                                   23 Claims

ABSTRACT OF THE DISCLOSURE

The coupling device to be interposed between two shafts comprises two rotary units adapted to be secured to said shafts, respectively, coaxially therewith, and an intermediate part for connecting said units together. Each rotary unit carries radial projections solid therewith, disposed at the ends of two diameters at right angles to each other. Resilient pads in the shape of annular sectors are interposed between said projections and radial arms rigid with the intermediate part.

The present invention is a continuation-in-part of my patent application No. 579,343 filed Sept. 14, 1966, now abandoned, for "Resilient Couplings."

The present invention relates to resilient coupling devices for connecting together two shafts or the like substantially in line with each other, such couplings including two rotary units adapted to be fixed to the respective ends of said shafts and interconnected through resilient pads of rubber or an elastomer.

One object of the present invention relates to the case where the coupling device includes an intermediate floating rotary part and it is to simplify the construction of such coupling devices while complying with the technical conditions of use most generally met with in practice, in particular for driving, through electric motors, machines such as pumps, fans, compressors, lines of shafts mounted on bearings, etc.

It is known that the shafts to be coupled together necessarily have, in the transverse, angular and axial directions, defects of alinement, both permanent and accidental, but in all cases capable of imposing, on said shafts and on their bearings, stresses and overloads the more important as the couplings that are used permit, in one or several of the three above mentioned directions, a smaller possibility of resilient deformation.

It is also known that resilient pads (of rubber or an elastomer) consisting for instance of a mass of gum adherent to two rigid radial walls, substantially flat and parallel to each other, carried respectively by the intermediate part and by one of the two rotary units, have:

(a) In a direction perpendicular to the planes of said walls (where they are submitted to compression and expansion stresses) a reduced flexibility associated with a strong capacity of load, and (b) On the contrary, in all directions parallel to said walls (where they are subjected to shearing stresses) a much greater flexibility, averaging at least three times the preceding one, but associated with a lesser capacity of load.

One feature of the invention consists in disposing, in such coupling devices, the resilient pads in such manner that, on the one hand, the tangential stresses corresponding to the torques to be transmitted are applied perpendicularly to the planes of said walls, that is to say compress or expand the pads and, on the other hand, the deformations due to said defects of alinement (transverse, angular or longitudinal) between the shafts produce shearing stresses on at least one half of said pads.

For this purpose, according to one feature of the present invention, the coupling device is arranged in such manner that its intermediate part, which is floating, is provided with at least two groups of radial arms cooperating, through resilient pads subjected, tangentially to the shafts, to compression and expansion stresses, each with a corresponding group of abutments rigid with only one of the two rotary units, the arrangement being advantageously such that it further ensures, when the parts are assembled together, a precompression of said pads.

Another object of the invention is to simplify the mounting of the coupling device between the two shafts to be coupled together by making this device in the form of a preassembled component structure.

Preferred embodiments of the present invention will be hereinafter described with reference to the appended drawings, given merely by way of example, and in which.

The coupling device according to the present invention essentially comprises the three following elements: On the one hand, two discs such as 6 and 7 adapted to be secured, through sleeves 3 and 4, respectively, on the ends of two shafts to be coupled together, on the other hand, at least one intermediate element or piece 9, and, finally, resilient pads 11 to be interposed between, on the one hand, two groups, at right angles to each other, of radial arms 10 rigid for instance with intermediate element 9, and, on the other hand, for each of said groups, abutments 13 rigid with one and the other of discs 6 and 7.

Figure 1:
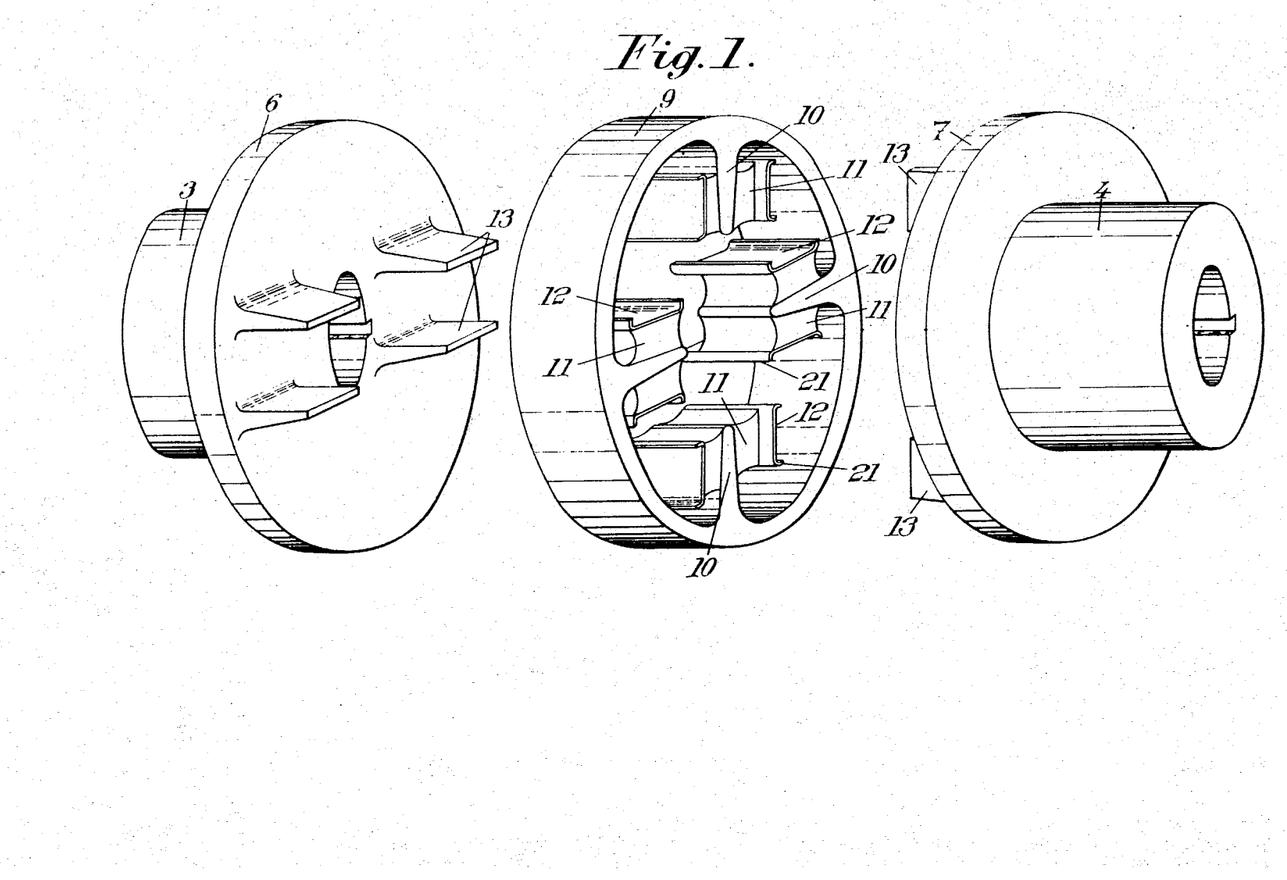
FIG. 1 is a diagrammatic exploded view of a coupling device according to the present invention.
Figure 2:
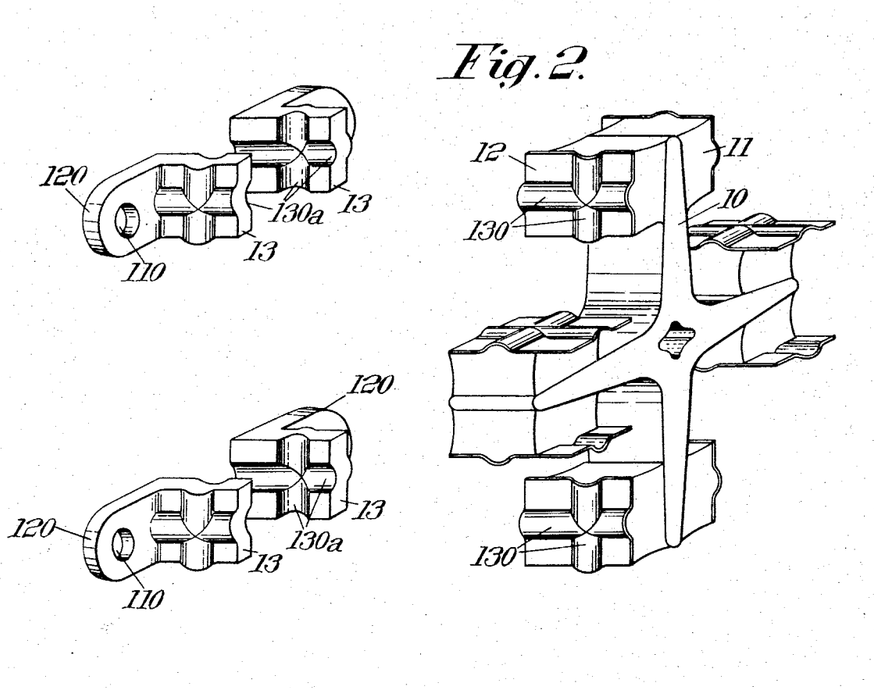
FIG. 2 similarly shows a coupling device made according to another embodiment of the invention.

If it is supposed, for instance, as shown by FIGS. 1 and 2 that said arms 10 are four in number and cooperate with abutments 13 suitably disposed on circular plates 6 and 7, it is found that such a device operates: (a) concerning the torque to be transmitted, as a resilient coupling through pads urged in compression and in expansion, (b) concerning the defects of transverse alinement of the two shafts, by radial alternating shearing deformations of the pads, in the same manner as in an Oldham joint, and (c) concerning the angular and longitudinal defects of alinement, by alternating longitudinal shearing deformations of the pads.

Preferably, the device is arranged in such manner that, on the parts assembled together, a precompression is applied to pads 11, which can be obtained in different manners, in particular: either by providing predetermined positions for the abutments 13 that cooperate with the same arm 10 and subjecting said pads, when they are fitted in position, to a compression by means of tongs or the like, or by giving said abutments a shape such that their fitting in position on the pads or upon armatures adhered thereto ensures the desired compression stress.

It is well known that in coupling of this general type the resilient pads, which are for example made of rubber, are substantially volumetrically incompressible, that is to say that although the pads become deformed during operation, their volume remains substantially constant. Thus, during the transmission of torque by the coupling the pad on one side of each arm 10 is compressed in the endwise direction of this pad—i.e. the direction normal to the arms 10 and to the abutment 13—that pad expands peripherally. As can be seen from the drawings, the pads are left free around their periphery to provide for this peripheral expansion.

According to the embodiment of FIG. 1, the intermediate piece 9 is in the form of a ring and its arms 10 are directed toward the axis thereof, these arms decreasing in circular section toward said axis.

Each of these arms is adapted to cooperate with two pads 11 of general flat shape. These pads are adhered, on the one hand, to arm 10 and, on the other hand to an external rigid plate 12 intended to cooperate with the corresponding abutment 13. Positioned curved edges 21 may be provided.

With such a device, the assembling of the parts is performed by moving circular plates 6 and 7 toward the intermediate piece 9, pads 11 being introduced, when suitably compressed by tongs or the like, into the spaces between abutments 13.

Any complementary fixation means between abutments 13 and plates 12 may be provided.

The embodiment of FIG. 2 is similar to that of FIG. 1, but the ther ing 9 of the first embodiment is replaced by a cross-shaped member formed by arms 10 the cross section of which decreases from the center toward the periphery.

Abutments 13 are secured to plates 6 and 7 through screws to be introduced in the holes 110 of lugs 120 rigid with said abutments.

The positioning edges 21 of FIG. 1 are, in this case, replaced by positioning means acting both axially and radially and which consist of cross-shaped projections 130 carried by plates 12 and adapted to fit in corresponding grooves 130a of abutments 13.

Figure 3:
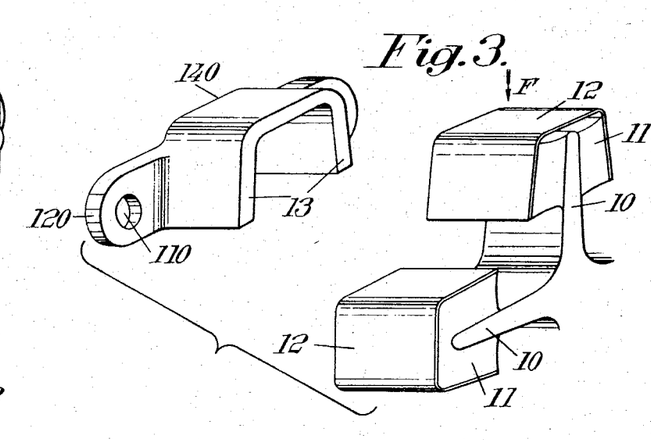
FIG. 3 partly shows in perspective view still another embodiment of the invention.
Figure 4:
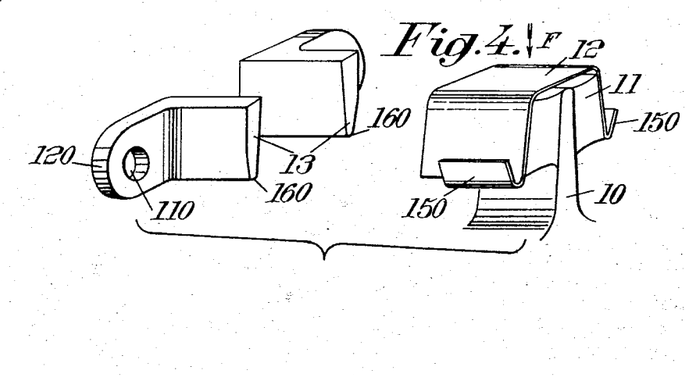
FIG. 4 similarly shows still another embodiment.
Figure 5:
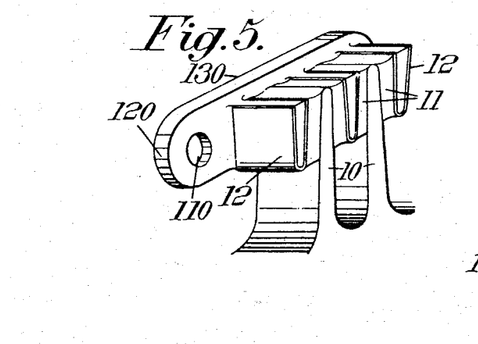
FIG. 5 is a perspective view of a portion of a coupling device made according to still another embodiment of the invention.

In the embodiments of FIGS. 3 to 5, the arrangement is similar, but the abutments are made of suitable shape for ensuring precompression of the rubber pads.

For instance, as shown by FIG. 3, precompression is obtained by a wedging effect under a radial stress. For this purpose, abutments 13 are carried by a piece 140 of U-shaped section the branches 13 of which diverge, toward the axis of the device in combination with a plate 12 of an analogous shape, which may possibly be deformable.

When the parts are assembled together, piece 140, moved in the direction of arrow F, being forced upon the whole of pads 11 and plate 12, there is obtained (account being possibly taken of possibilities of deformation of said plate 12) a compression and shearing preliminary stressing of pads 11.

The same result is obtained with the arrangement of FIG. 4, where abutments 13, which in this case are distinct from each other, are moved in the radial direction F during mounting, thus driving plate 12 in the same direction so as to obtain the desired prestressing. This movement is made easier by the provision on plate 12 of curved edges 150 against which the ends 160 of abutments 13 are adapted to bear.

FIG. 5 shows the possibility of multiplying the number of arms 10. In this case, a group of two arms is used and cooperates with a group of pads. Rigid plates 12, of inverted U shape, cooperate with abutments 10 thus exerting a radial effect precompression.

Figure 6:
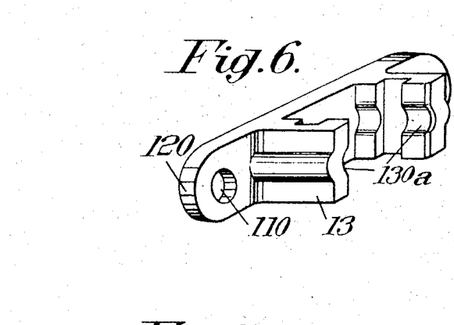
FIG. 6 separately shows in perspective view one of the parts of a coupling device made according to still another embodiment.

Instead of moving plate 12 radially during assembly, as supposed by FIGS. 3 to 5, an effort might be applied longitudinally on plate 12. Supposing for instance plates 12 to be arranged in the manner illustrated by FIG. 2, a tangential compression would be obtained by introducing the whole of the two pads 11 and of the two plates 12 cooperating with the same arm into a forked element of the kind of that illustrated by FIG. 6, acting in the manner of a jaw.

In order to simplify the mounting and removal of a coupling device according to the present invention, the active portion of said device is in the form of a pre-assembled composite structure the outer faces of which are adapted to fit against discs rigid with the two shafts to be coupled together, whereby, in order to assemble the coupling device, it suffices to insert said composite structure between said discs and to secure, through simple means such for instance as balls or screws, the opposite faces of the composite structure with the corresponding faces of the discs.

Figure 7:
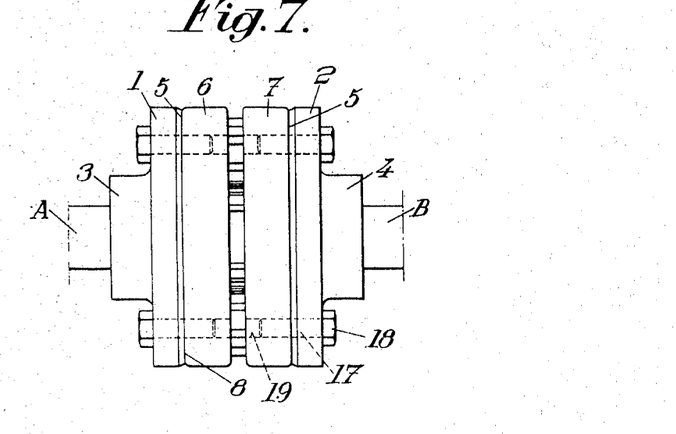
FIG. 7 is a diagrammatic elevational view showing a coupling device of the Oldham type made according to still another embodiment of the invention.
Figure 8:
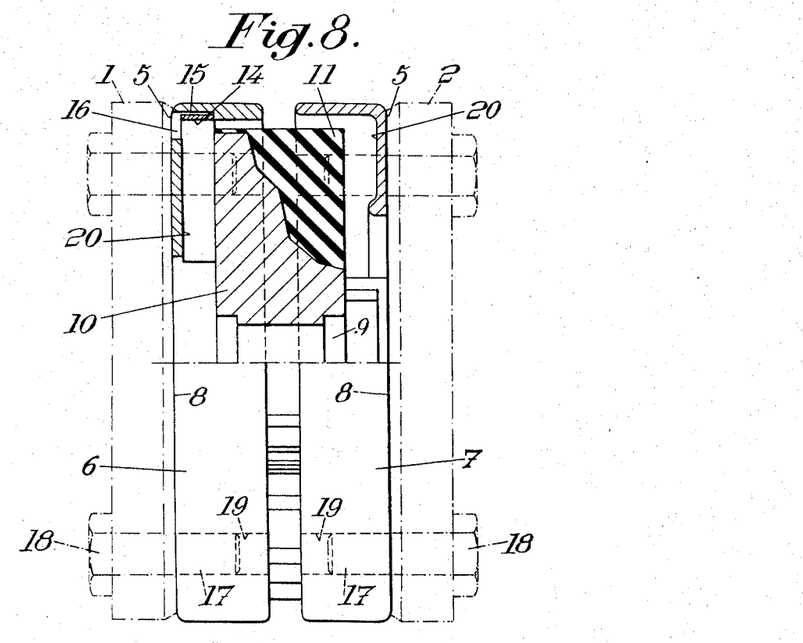
FIG. 8 is a view on an enlarged scale, half in section and half in elevation, showing a composite structure belonging to the coupling device of FIG. 7.
Figure 9:
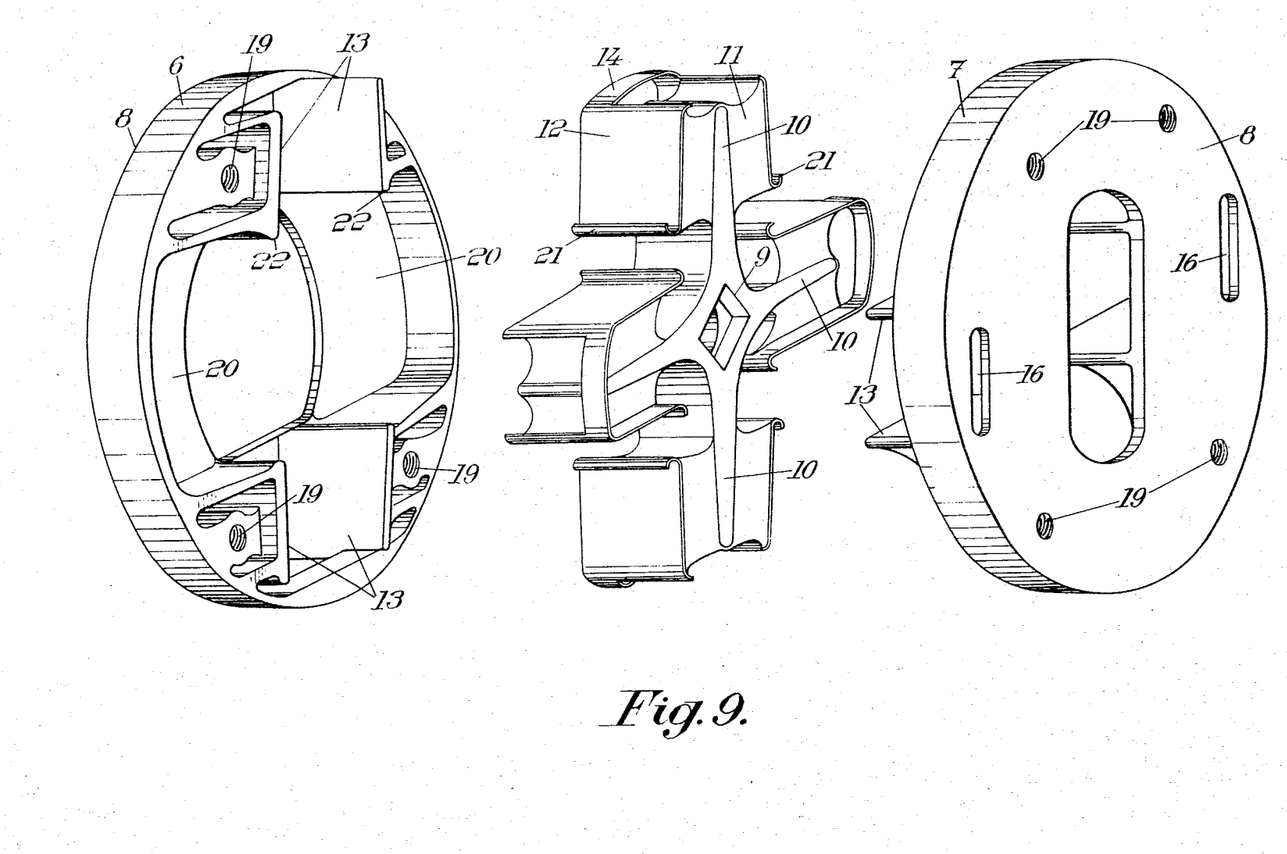
FIG. 9 is an exploded perspective view showing the elements of the coupling device of FIG. 7.
Figure 10:
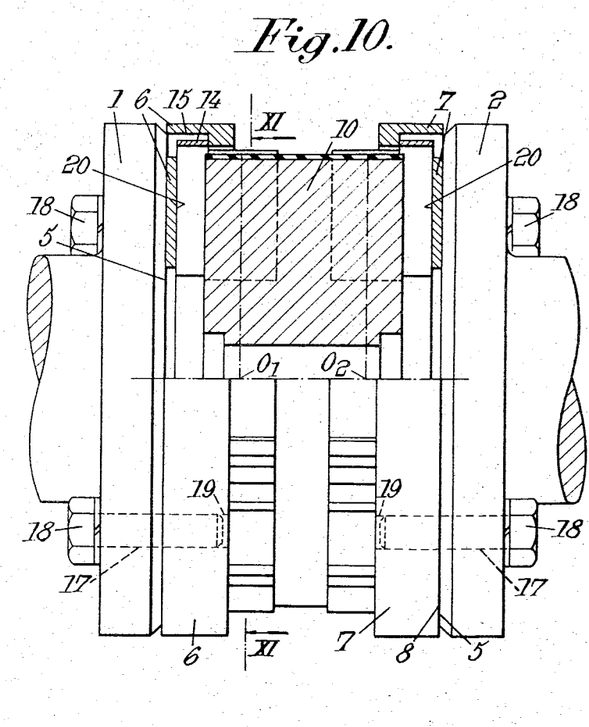
FIG. 10 is a view, half in section and half in elevation, of a coupling device of the universal joint type made according to still another embodiment of the invention.

According to the embodiment of FIGS. 7 to 9, the coupling device, which is of the Oldham type is to be inserted between the flat faces 5 of discs 1 and 2 rigid with sleeves 3 and 4, keyed on shafts A and B, respectively.

This coupling device includes the following elements: on the one hand hollow discs 6 and 7 having cylindrical edges and the respective outer faces 8 of which are flat and adapted to be applied against the faces 5 of the corresponding discs 1 or 2, whereas the inner face 20 of each hollow disc 6, 7 carries radial abutments 13, and on the other hand a floating element 9 provided with radial arms 10 carrying resilient pads 11.

In this embodiment, the two resilient pads 11 carried by a radial arm 10 are lined with a metallic resilient casing 12 adapted to fit between the two abutments 13 of the corresponding hollow disc 6 or 7.

Two pairs of pads 11 carried by two opposed arms 10 of floating element 9 are secured to hollow disc 6, whereas the two pairs of pads 11 carried by the arms 10 at right angles to those first considered are secured to the other hollow disc 7. Whereas torques are transmitted by compression of the rubber pads, said pads are free to work in shearing fashion in the direction of the planes of arms 10 with respect to one or the other of hollow discs 6 and 7, which permits of ensuring a correct drive from one shaft A to the other B even when said shafts are not exactly in line with each other. A supplementary possibility lies in the operation with said shafts making a slight angle wtih each other.

The three elements visible in FIG. 9 can be assembled together into a single composite structure by exerting upon reinforcing plates 12 a centripetal radial action before engaging pads 11 into the intervals between the pairs of corresponding abutments 13, which are oblique to each other. This ensures a prestressing of the rubber pads. Once the pads have thus been fitted in position, they are kept in this position by the engagement of an arcuate strip 14 belonging to every reinforcement 12 and which comes, when the parts are assembled together, to fit into a notch 15 provided in the inner periphery of the corresponding hollow disc 6 or 7. 16 are apertures which permit of machining these notches and which may be used for other purposes.

Curved edges 21 are provided on the reinforcement 12 for cooperating with projections 22 of abutments 13.

When such a composite structure, including prestressed pads 11, has been prepared, it can be mounted in the free space between discs 1 and 2 in a very simple manner, the flat faces 8 of hollow discs 6, 7 fitting against the corresponding flat faces 5 of said discs 1, 2. The structure is secured in position by bolts 17 the heads 18 of which are engaged from the outside whereas their threaded rods engage in screw-threaded holes 19 provided in discs 6 and 7.

Said discs 6 and 7 may be obtained by molding and/or by machining.

The removal of a composite structure will be performed by unscrewing bolts 17 and removing them.

The embodiment of FIGS. 10 to 13 inclusive, which corresponds to a double universal joint, is similar, each elementary universal joint having its center at $O_1$ and $O_2$ respectively.

In this construction, each arm 10 of intermediate piece 9 carries two distinct pairs of pads 11, each pair being connected to one of the hollow discs 6, 7 through means 12, 13, 14 of the same kind as above described.

Figure 11:
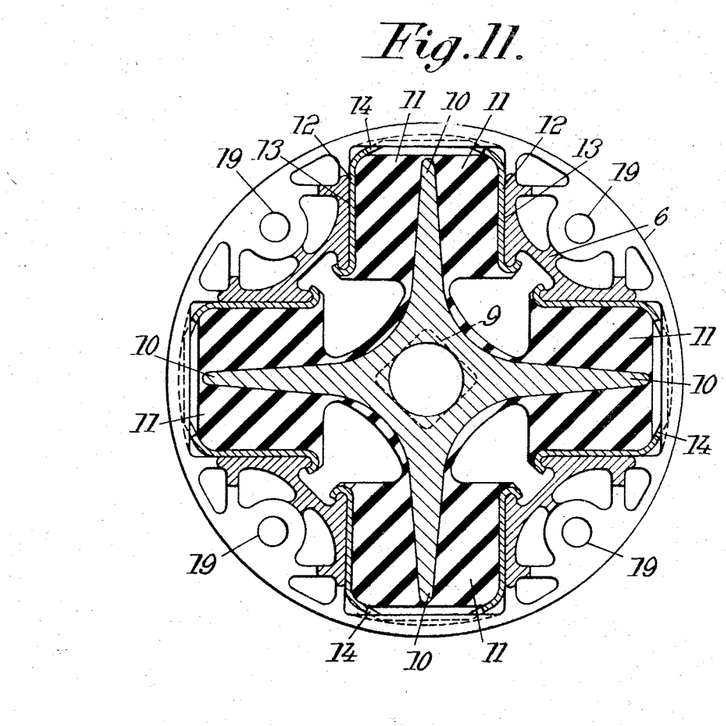
FIG. 11 is a sectional view of said coupling device on the line XI—XI of FIG. 10.
Figure 12:
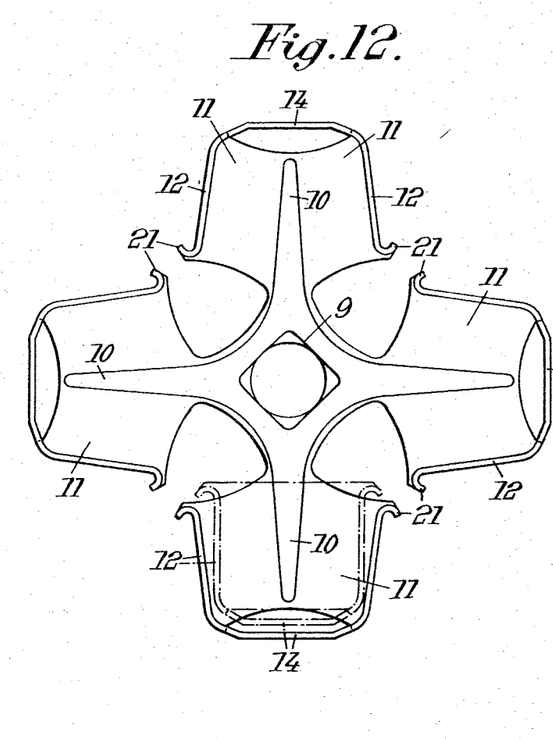
FIG. 12 is an end view of an element of the device of FIGS. 10 and 11.
Figure 13:
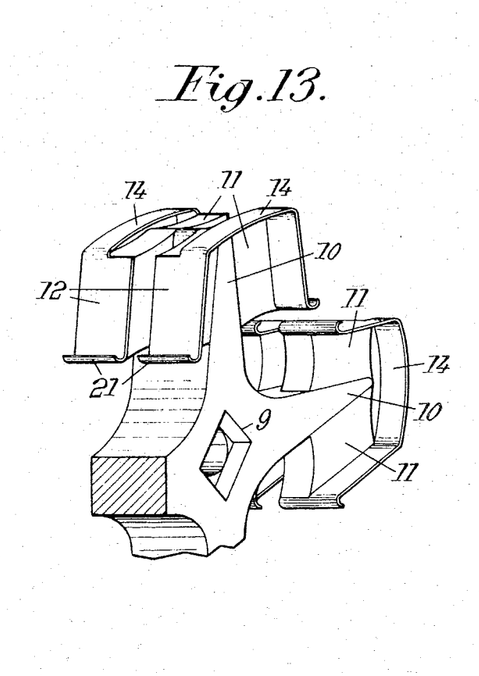
FIG. 13 is a perspective view showing a portion of said element.

In this embodiment, abutments 13 are parallel. Preliminary compression is performed before assembly by means of suitable tools from an initial position illustrated by FIG. 12 (the dotted lines illustrating the position after prestressing), FIG. 11 shows the device after assembly in said prestressed position.

Figure 14:
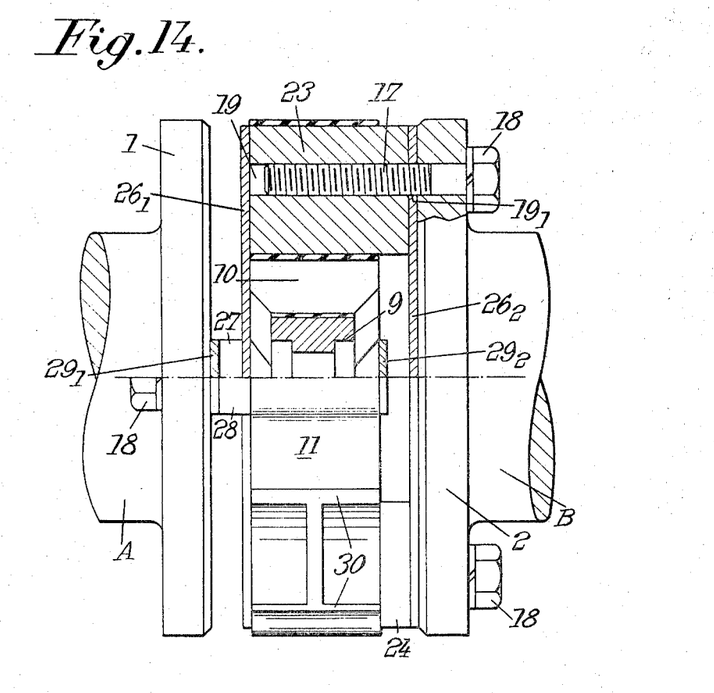
FIG. 14 is a view similar to FIG. 7 relating to a coupling device made according to still another embodiment of the invention.
Figure 15:
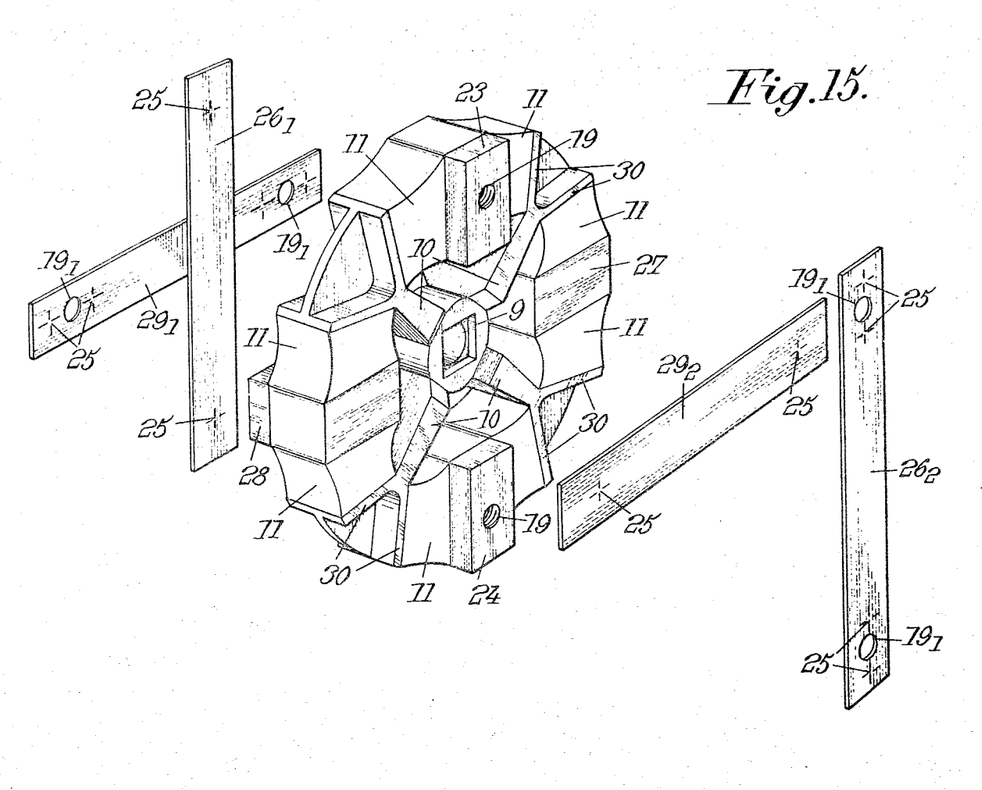
FIG. 15 is an exploded perspective view showing the parts of the removable composite structure of FIG. 14.

The embodiment of FIGS. 14 and 15, which relates to an Oldham coupling, includes an intermediate piece 9 provided with four arms 10, two opposite pairs of pads 11 to be connected to a disc 1, and two other pairs of pads 11 disposed along a diameter at right angles to the direction of the arms carrying the two first mentioned pairs of pads and cooperating with the other disc 2.

The two hollow discs 6 and 7 of the embodiments of FIGS. 7 to 13 are replaced by the following assemblies: on the one hand, two rigid blocks 23, 24 located at the opposite ends of a diametral plane and supporting corresponding pads 11, said blocks 23 and 24 being connected, for instance by welding at 25, through tie strips $26_1$ and $26_2$, and on the other hand, a similar system 27, 28, $29_1$ and $29_2$.

The respective pads 11 bear, on the one hand, against the side faces of said blocks 23, 24, 27 and 28 and, on the other hand, on suitable extensions 30 or arms 10, tie strips $28_1$, $28_2$, $29_1$ and $29_2$ being secured by welding after radial prestressing of the pads has been performed.

The two pairs of rigid blocks 23, 24 and 27, 28 are offset longitudinally so as to ensure the necessary freedom between said blocks and the discs 1 and 2 to be assembled therewith. FIG. 14 shows that after assembly, and owing to this offsetting, free spaces are left between the tie strips $26_1$, $27_1$ and $26_2$, $29_2$.

In this construction also, after the various elements have been assembled together and the welds have been made, there is obtained a composite structure which can be secured to discs 1 and 2. In this case, screw threaded holes 19 are provided in blocks 23, 24, 27 and 29 and corresponding holes $19_1$ are provided in tie strips $26_2$ and $29_1$.

It is thus possible to obtain coupling devices having, with respect with those known up to this time many advantages and in particular: that of permitting an advantageous solution of the problems that occur when it is desired to couple together two shafts liable to move with respect to each other, and that of greatly simplifying the mounting and removal of the composite structure above described.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. For connecting together two shafts normally in line with each other, a coupling device which comprises, in combination, two rigid discs adapted to be secured to the respective ends of said shafts, an intermediate rigid rotary part interposed between said two discs, said part having an axis of rotation normally in line with the respective axes of said discs, said intermediate part being generally star-shaped and including a plurality of arms projecting radially outwards, a plurality of pairs of substantially radial abutments rigid with each of said discs and extending toward the other disc, each of said pairs of abutments corresponding respectively to an arm of said intermediate part, the pair of abutments of each of said discs being located at equal angular intervals about the axis of said disc and each pair of abutments of one disc being located at mid-distance angularly between two pairs of abutments of the other disc, each of said intermediate part radial arms being located between the two radial abutments of the corresponding pair, a plurality of pairs of pads, each of said pairs of pads corresponding respectively to an arm of said intermediate part, and the two pads of each pair of pads corresponding respectively to the two abutments of each pair of abutments, each pad being made of resilient material that is substantially volumetrically incompressible, the two pads of each pair of pads being disposed respectively on opposite sides of their corresponding arm with each pad precompressed in at least one direction thereof between said arm and its corresponding abutment, each pad being adhered via one end to its corresponding arm and via another end, opposite to said one end, to its corresponding abutment, and each pad having a free space around its periphery so that said pad can expand peripherally into said free space when said pad is compressed endwise by a force substantially perpendicular to the corresponding abutment and to the corresponding arm, said pads being so disposed that, on the one hand, the tangential stresses corresponding to the torques to be transmitted from one disc to the other are perpendicular to said radial projections and produce endwise compressions in one pad of each pair of pads and endwise expansion in the other pad of each pair of pads, and, on the other hand, defects of alignment between said shafts produce shearing stresses of at least one half of said pads.

2. A coupling device according to claim 1 wherein said radial arms are the arms of said cross-shaped member, the circumferential width of said arms decreasing gradually from the central portion of said intermediate part toward the peripheral ends of said arms.

3. A coupling device according to claim 1 wherein said abutments are integral with said discs.

4. A coupling device according to claim 1 wherein said abutments are rigidly secured to said discs.

5. A coupling device according to claim 1 wherein said pads are prestressed radially.

6. A coupling device according to claim 1 wherein said pads are prestressed tangentially.

7. A resilient device according to claim 1 wherein each pair of said abutments forms a U-shaped piece with branches diverging from each other toward the axis of the device, said device comprising a U-shaped lining of corresponding shape adhered to a pair of pads and adapted to fit in said U-shaped piece.

8. A coupling device according to claim 7 further comprising an external lining adhered to said pads and provided with bent edges for supporting, when the parts are assembled together, radial stresses from said abutments.

9. A coupling device according to claim 1 wherein said intermediate part has four radial arms, and wherein each disc includes two pairs of abutments in line with each other and extending on either side of one diameter thereof to be located on opposite sides of one of said radial arms respectively, to which they are parallel, the two paris of one disc being at right angles to the two pairs of the other disc.

10. A coupling device according to claim 9 wherein said intermediate element is a cross-shaped member and said radial arms are the arms of said cross-shaped member, the circumferential width of said arms decreasing gradually from the central portion of said member toward the peripheral ends of said arms.

11. A coupling device according to claim 9 comprising plates intended to cooperate with said abutments, said pads being adhered on one face thereof with said radial projections and on the other face thereof with plates.

12. A coupling device according to claim 9 wherein said abutments are integral with said discs.

13. A coupling device according to claim 9 wherein said abutments are rigidly secured to said discs.

14. A coupling device according to claim 9 wherein said pads are prestressed radially.

15. A coupling device according to claim 9 wherein said pads are prestressed tangentially.

16. A resilient device according to claim 9 wherein each pair of said abutments forms a U-shaped piece with branches diverging from each other toward the axis of the device and comprising a U-shaped lining of corresponding shape adhered to a pair of pads and adapted to fit in said U-shaped piece.

17. A coupling device according to claim 16 further comprising an external lining adhered to said pads and provided with bent edges for supporting, when the parts are assembled together, radial stresses from said abutments.

18. For connecting together two rotating discs having respective axes of rotation normally in line with each other and facing each other, a coupling device which comprises, in combination, two rotary units, each coaxial with one of said discs, respectively, said units being disposed opposite each other and having respective outer faces adapted to fit against said discs, each of said units carrying, rigid therewith, substantially radial projections extending toward the other unit, the projections of each of said units being located at equal angular intervals about the axis of said unit, all these projections being disposed in a single annual row about the common axis of said rotary units when they are in line with each other, and each of the projections of one unit being located at mid-distance between two projections of the other unit, pads of a resilient material fitted against the radial sides of said projections and adapted resiliently to prevent relative rotation of said units with respect to each other, said pads being located in said annular row, said units and said pads being assembled together to form a single composite structure, and removable means for rigidly securing each of the rotary units of said composite structure to the corresponding disc, respectively, upon which it fits.

19. A coupling device according to claim 18, further including an intermediate rigid rotary part having radial arms distributed about its axis, said intermediate part being disposed with its axis normally in line with the axes of said rotary units, said resilient material pads being each interposed between one of said radial arms and a projection of one of said rotary units.

20. A coupling device according to claim 19 wherein there are two of said rotary units, each of them comprising a hollow disc having a flat face and a cylindrical extension directed toward the other disc, said disc carrying two pairs of substantially radial abutments located at a distance from each other at the respective ends of a diameter of said disc, the two abutments of each pair being parallel and leaving a space between them, the abutments carried by one disc extending in a direction at right angles to that of the abutments carried by the other disc, said abutments projecting beyond the edge of the corresponding cylindrical extension so that the end portions of the abutments of the two discs overlap one another in the middle region between said discs, said pads being located in said middle region.

21. A coupling device according to claim 20 further comprising resilient metallic casings each surrounding the two pads located on opposite sides of every arm of said intermediate rotary part, the middle portion of each of said casings consisting of an arcuate strip, the inner wall of the cylindrical portion of each hollow disc being provided with a notch adapted to accommodate said strip.

22. A coupling device according to claim 19 wherein the walls of said radial projections are oblique to at least one of the radial and axial directions to produce a prestressing of said resilient pads.

23. A coupling device according to claim 18 wherein there are two of said rotary units, each of them comprising: a pair of rigid blocks located in a diametral plane of said rotary part on opposite sides of the axis thereof, and two tie strips secured to said pair of blocks for assembling them together, said strips extending in the direction of said diametral plane and perpendicularly to said axis, the diametral plane of one rotary unit being at right angles to the diametral plane of the other rotary unit, said four rigid blocks being partly located in the region between two planes perpendicular to said axes, when said axes are in line with each other, but said pairs of rigid blocks projecting to the outside of said region, in opposed directions for said two pairs, respectively, the ends of the arms of said intermediate rigid part being forked, and said pads being located in said middle region, between said blocks and said forked ends of said arms.

References Cited

UNITED STATES PATENTS

| 2,337,287 | 12/1943 | Williams | 64—14 |
| 2,421,134 | 5/1947 | Venditty | 64—14 |
| 3,094,853 | 6/1963 | Boschi | 64—14 |
| 3,293,883 | 12/1966 | Boschi et al. | 64—14 |

FOREIGN PATENTS

| 988,773 | 5/1951 | France. |
| 681,328 | 9/1939 | Germany. |

HALL C. COE, *Primary Examiner.*

U.S. Cl. X.R.

64—31